(12) United States Patent
Keene et al.

(10) Patent No.: US 7,141,903 B2
(45) Date of Patent: Nov. 28, 2006

(54) LOW MAGNETIC SIGNATURE MOTOR SYSTEM

(75) Inventors: Mark Nicolas Keene, Malvern Worcestershire (GB); Stephen Ralph Takel, Weymouth Dorset (GB); Peter George Shaw, Weymouth Dorset (GB)

(73) Assignee: Qinetiq Limited (GB)

( * ) Notice: Subject to any disclaimer, the term of this patent is extended or adjusted under 35 U.S.C. 154(b) by 56 days.

(21) Appl. No.: 10/416,608

(22) PCT Filed: Oct. 31, 2001

(86) PCT No.: PCT/GB01/04816

§ 371 (c)(1),
(2), (4) Date: May 13, 2003

(87) PCT Pub. No.: WO02/41474

PCT Pub. Date: May 23, 2002

(65) Prior Publication Data

US 2004/0104632 A1    Jun. 3, 2004

(30) Foreign Application Priority Data

Nov. 15, 2000   (GB) ................................ 0027806.9

(51) Int. Cl.
*H02K 5/10*   (2006.01)
(52) U.S. Cl. ........................................................ 310/85
(58) Field of Classification Search ................ 310/85, 310/113, 114, 89, 52, 58
See application file for complete search history.

(56) References Cited

U.S. PATENT DOCUMENTS

| | | | | |
|---|---|---|---|---|
| 4,121,126 A | * | 10/1978 | Armor et al. ................. | 310/59 |
| 4,359,761 A | * | 11/1982 | Papst .......................... | 360/96.3 |
| 5,661,353 A | * | 8/1997 | Erdman et al. ............... | 310/86 |
| 5,859,482 A | * | 1/1999 | Crowell et al. ............... | 310/58 |
| 6,373,921 B1 | * | 4/2002 | Kliman et al. ............... | 378/131 |

FOREIGN PATENT DOCUMENTS

| | | | |
|---|---|---|---|
| BE | 832177 | | 12/1975 |
| GB | 2020118 | | 11/1979 |
| JP | 057152560 | | 9/1982 |
| JP | 362012364 A | * | 1/1987 |

OTHER PUBLICATIONS

Dobrodejev, et al., "Magnetically Quiet Shipboard-Type Electrical Equipment: Methods in Design and Manufacturing", Oceans '98 Conference Proceedings, Nice, Sep. 28-Oct. 1, 1998, IEEE Oceans Conference, New York, IEEE U.S. vol. 3, pp. 1468-1472 (1998).

(Continued)

*Primary Examiner*—Darren Schuberg
*Assistant Examiner*—Nguyen Hanh
(74) *Attorney, Agent, or Firm*—McDonnell Boehnen Hulbert & Berghoff LLP

(57) ABSTRACT

A low magnetic signature motor system (1) comprises a plurality of electric motors (2), a first shield (9) and a second shield (13). The electric motors are arranged with their associated magnetic moments (6, 7) forming a closed loop such that their net external magnetic field (5) is minimized The first shield comprises a material with a high electrical conductivity and substantially surrounds the electric motors such that the a.c. component of the magnetic field is reduced; and the second shield comprises a material with a high magnetic permeability and substantially surrounds the first shield such that the d.c. magnetic field is reduced.

8 Claims, 4 Drawing Sheets

OTHER PUBLICATIONS

Kildisheve, "External Magnetic Field Active Compensation for Large Shipboard-type AC Machines," Oceans 97 MTS/IEEE Conference Proceedings Halifax, NS, Canada Oct. 6-9, 1997, New York, NY USA, IEEE, US pp. 1496-1501 (1997).

* cited by examiner

LOW MAGNETIC SIGNATURE MOTOR SYSTEM

This invention relates to a low magnetic signature motor system, more particularly to a system suitable for use on an autonomous vehicle.

There are a variety of sensors which can be used to detect magnetic fields in order to locate magnetic objects such as undersea pipelines and mines. These include magnetic gradiometers, superconducting quantum interference devices (SQUID), fluxgates, magnetoresistors and Hall sensors. The major problem associated with the use of such sensors is interference from unwanted sources of magnetic fields. This is particularly so when the sensor is to be mounted on a vehicle. Magnetic gradiometers have been successfully operated from towed floating plafforms, but it has been found necessary to site the gradiometer at a distance from the towing vessel to avoid compromising the sensitivity of the detector. Magnetic sensors have also been towed from aircraft, once again at a distance from the aircraft itself. Attempts to move the sensors within the aircraft have met with limited success. This is due to the magnetic field generated by the metal structure of the airframe swamping the signal of interest.

A vehicle needs to be provided with a motive source and, in the case of an electric vehicle, a power supply. These may give rise to magnetic fields which will severely impinge on the usefulness of any onboard magnetic sensor. The strength of these magnetic fields is usually several orders of magnitude stronger than the field of interest. In the case of a remotely operated vehicle, the problem can be partially overcome as it is possible to site the power source at a considerable distance from the vehicle itself and provide power to the vehicle via an umbilical. This removes one source of magnetic interference. The magnetic field generated by the motive source, which is often provided by electric motors, does however still require that any magnetic sensor be towed behind the vehicle.

For a non-umbilical remotely operated vehicle or a completely autonomous vehicle, both the power source and the motive source must be onboard the vehicle. Of these sources of unwanted magnetic field, electric motors cause the greatest difficulty to the designer of a magnetic sensor platform. Typically, the types of electric motor suitable as motive sources for autonomous underwater vehicles produce a magnetic field with a strength of the order of $10^{-1}$ Tesla. This is considerably stronger than the magnetic field of the earth, which is itself up to seven orders of magnitude greater than the strength of the magnetic fields generated by the objects many magnetic sensors are designed to detect. These fields can be as low as $5\times10^{-12}$ Tesla. Consequently, the presence of such relatively strong unwanted magnetic fields severely compromises the usefulness of any nearby magnetic sensor.

The magnetic field generated by an electric motor has two components. The first arises from the permanent magnets used to form the stator. These produce a strong permanent magnetic field often referred to as the d.c. signature of the motor. Commercial electric motors may incorporate a peripheral ring made from soft iron in order to partially reduce the residual d.c. signature. Although relatively effective with regard to the reduction of the external d.c. field, such iron rings cannot reduce fields sufficiently to allow sensitive magnetic sensors to be operated nearby.

The second source of magnetic field generated by an electric motor arises due to the motion of the armature. The armature comprises a former made from a magnetic material around which is wound a conductor, usually copper wire. The application of a current to the armature windings generates a non-permanent magnetic field which alternates with the shaft speed, and varies in strength with the magnitude of the current flowing in the armature. The frequency of this field is determined by the product of the number of poles on the former and the speed of rotation of the armature. This field is often referred to as the a.c. signature of the motor.

There is a third source of magnetic field which is not directly a characteristic of the motor, but is associated with the procedure employed to control the motor speed. It is possible to control the speed of an electric motor by applying continuous current to the armature windings. The speed of the motor is then proportional to the magnitude of the applied current. A more usual approach is to apply a chopped current to the armature windings. This takes the form of a pulsed wave train, where the Mark-space ratio determines the net power to the motor. Maximum current is applied to the windings for a set time period and then switched off. The speed of the motor is controlled by altering the ratio between the time the current is on and the time it is off. Fourier analysis of the square wave shows that it is formed from a harmonic series that extends to high frequencies. The resultant field due to the chopped current is additional to, and usually contains components with higher frequencies than, the a.c. signature arising from the rotation of the armature.

In accordance with the present invention a low magnetic signature motor system comprises a plurality of electric motors, a first shielding means and a second shielding means; wherein the electric motors are arranged with their associated magnetic moments forming a closed loop such that their net external magnetic field is minimised; wherein the first shielding means comprises a material with a high electrical conductivity and substantially surrounds the electric motors such that the a.c. component of the magnetic field is reduced; and wherein the second shielding means comprises a material with a high magnetic permeability and substantially surrounds the first shielding means such that the d.c. magnetic field is reduced.

The present invention reduces the total external magnetic field of a set of electric motors over an extended frequency range, by reducing simultaneously the d.c. signature, the a.c. signature and the additional a.c. field from the motor speed control procedure. The combined effect of the different field reduction steps is significant and exceeds the predicted benefits based on any step in isolation.

Each motor has an associated magnetic moment arising from the permanent magnets of the stator. By arranging the motors so that these moments form a closed loop the magnetic field is channelled in a circuit through the motors thereby reducing the external residual field. For the simplest case, two dipole motors are arranged to form a quadrupole so that their magnetic moments are anti-parallel. In this specification the term anti-parallel as applied to magnetic moments refers to those which are parallel to one another but in opposite directions. Any number of motors may be arranged so that their magnetic moments form a closed loop, for example three motors may be arranged as a triangle, four as a square, and so on. Furthermore, the motors need not be simple dipole motors; quadrupole, octopole or other higher polar order motors may equally be used.

The first shielding means is employed to reduce the magnitude of the a.c. signature generated while the motor is in operation and also the additional a.c. field associated with the motor speed control procedure. This works on the principle of inductive shielding. The cyclical magnetic fields cause eddy currents to be set up in the first shielding means which in turn give rise to a ring current. Following Lenz's law, this current opposes the a.c. field thereby reducing the magnitude of the field measurable outside the shield. The effectiveness of an inductive shield is a function of the conductivity of the material used and the inductance of the shield, which itself is dependent on the shield geometry. The shielding effectiveness is usually quantified by the shielding factor, 5, defined as the ratio of the measured field in the absence of the shield to that with the shield in place. For an inductive shield, S increases substantially linearly with frequency. This means that it is ineffective as a shield for d.c. signatures and highly effective at high frequencies.

Preferably, the first shielding means comprises one of copper, aluminium, silver or gold. These materials all have high conductivity. For the same geometry, an inductive shield made from a highly conducting material will have a higher shielding factor than one made from a poorer conductor. Lower conductivity materials may be used, however the amount of such a material would have to be greater in order to compensate for the lower conductivity.

Preferably, the first shielding means comprises a tube in the form of a helical coil. This allows a coolant to be circulated through the tube, preventing the motors from overheating in use. Water or oil based coolants are suitable, as are organic liquids, gases and liquefied gases.

Preferably, the second shielding means comprises one of mu-metal, iron, steel or nickel.

Most preferably, the second shielding means comprises mu-metal.

The use of mu-metal as the second shielding means effectively reduces the external d.c. signature. Mu-metal has an extremely high magnetic permeability and is therefore an effective shield for d.c. and low frequency magnetic fields. However, as the strength of the field increases the effectiveness of the mu-metal decreases. A point is reached where the mu-metal becomes saturated, the relative magnetic permeability tends to one and the shield becomes significantly less effective. In the present invention this situation is avoided by arranging for the magnetic moments of the motors to be antiparallel as described above. This ensures that the magnitude of the d.c. field reaching the second shielding means is always significantly below the saturation limit of the mu-metal.

A further drawback when using mu-metal is that above a certain threshold frequency, which is highly material dependent, the magnetic permeability and hence the effectiveness of shielding decreases. It is therefore less effective as a shield for the a.c. component of the magnetic field.

At higher frequencies still, the mu-metal shield behaves as an inductive shield in the manner described above for the first shielding means. However, because mu-metal is a low conductivity alloy the effect is small and only manifest at high frequencies.

The invention will now be described by way of example only with reference to the following drawings in which.

Figure 3:
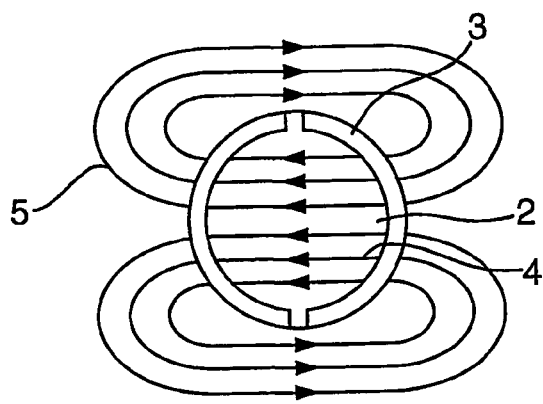
FIG. 3 shows a representation of the stator of an electric motor and its associated magnetic field.
Figure 4:
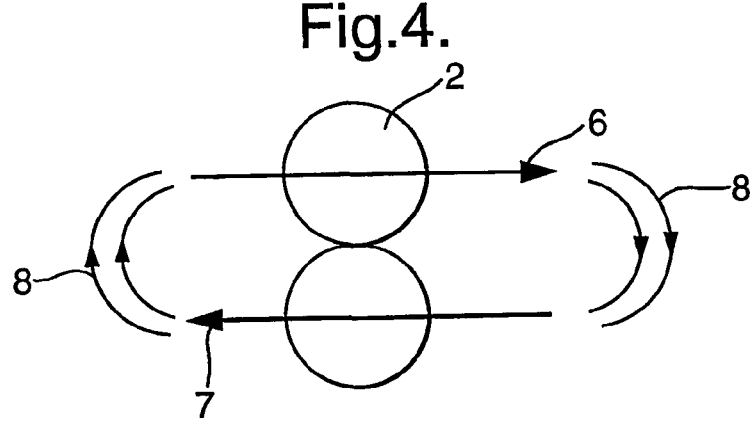
FIG. 4 shows a representation of the magnetic moments of two electric motors.

A low magnetic signature motor system 1 comprises two electric motors 2. These motors are arranged so that their magnetic moments are antiparallel. The motors have a magnetic dipole moment by virtue of the permanent magnets used to form the stator. This is shown in detail in FIG. 3. A single motor 2 is shown in plan view with the armature and windings omitted for clarity. Two magnets 3 form the stator. The magnetic field within the motor is represented by the straight arrows 4 and this extends to the external magnetic field indicated by the curved arrows 5. The direction of the straight arrows 4 indicates the direction of the magnetic moment The external field is the source of the d.c. signature of the motor. In FIG. 4 the motors are represented simply as circles and the straight arrows 6 and 7 show the direction of the associated magnetic moments. As shown in FIG. 4, if the magnetic moments are arranged so that they are antiparallel, i.e. parallel to each other but in opposite directions, then the magnetic field lines 8 flow in a closed loop from one motor to the other. This has the effect of significantly reducing the external magnetic field. The magnetic field from a dipole source falls off as the third power with distance whereas the field form a quadrupole source falls off with the fourth power of distance. This means that, at a given distance the field from a quadrupole source is smaller than that from a dipole source. The arrangement of motors in FIG. 4 forms aquadrupole source.

Figure 5A:
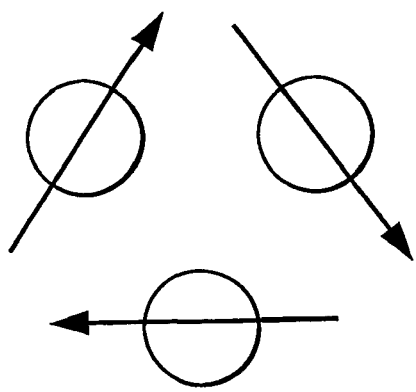
FIGS. 5a to 5d show representations of the magnetic moments of three and four electric motors for use in the system of the present invention.
Figure 5B:
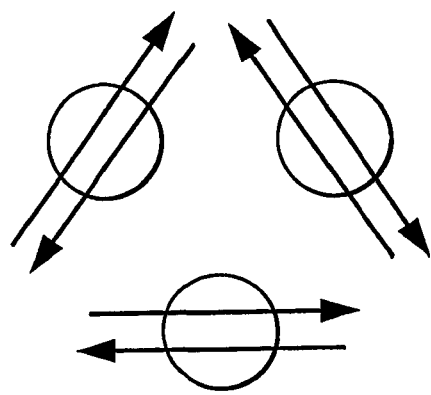
Figure 5C:
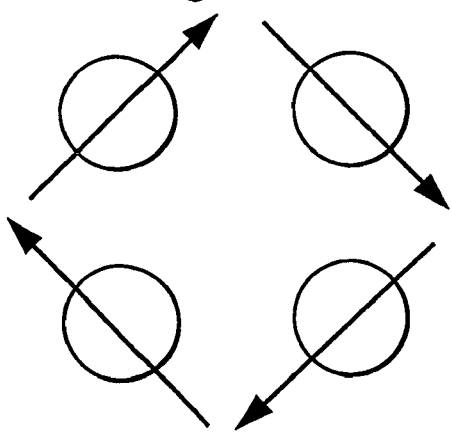
Figure 5D:
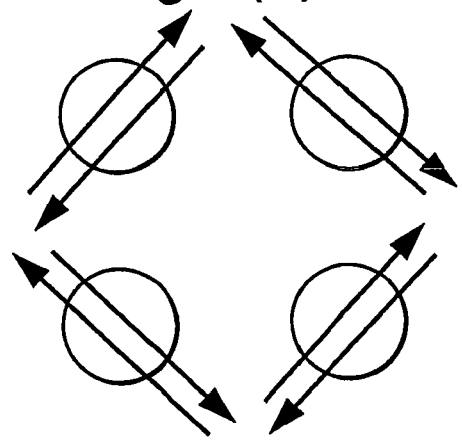

Some illustrative examples of alternative motor arrangements are shown in FIGS. 5a–5d. In FIG. 5a, three dipole motors are arranged as a triangle and FIG. 5b shows a similar arrangement of three quadrupole motors. In both cases the magnetic moments of the motors, represented by the arrows, form a closed loop. As described above, this minimises the external magnetic field of the motors. Four dipole and four quadrupole motors are arranged in a square as shown in Figs. Sc and Sd respectively.

Figure 1:
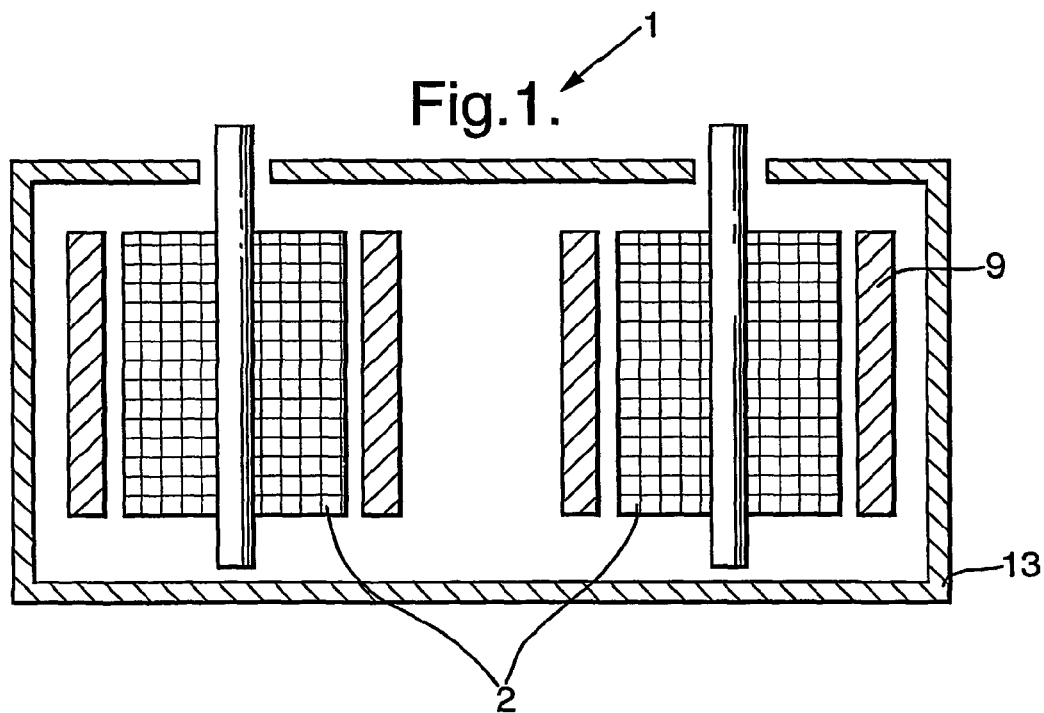
FIG. 1 shows a cross section of a low magnetic signature motor system according to the present invention.
Figure 2:
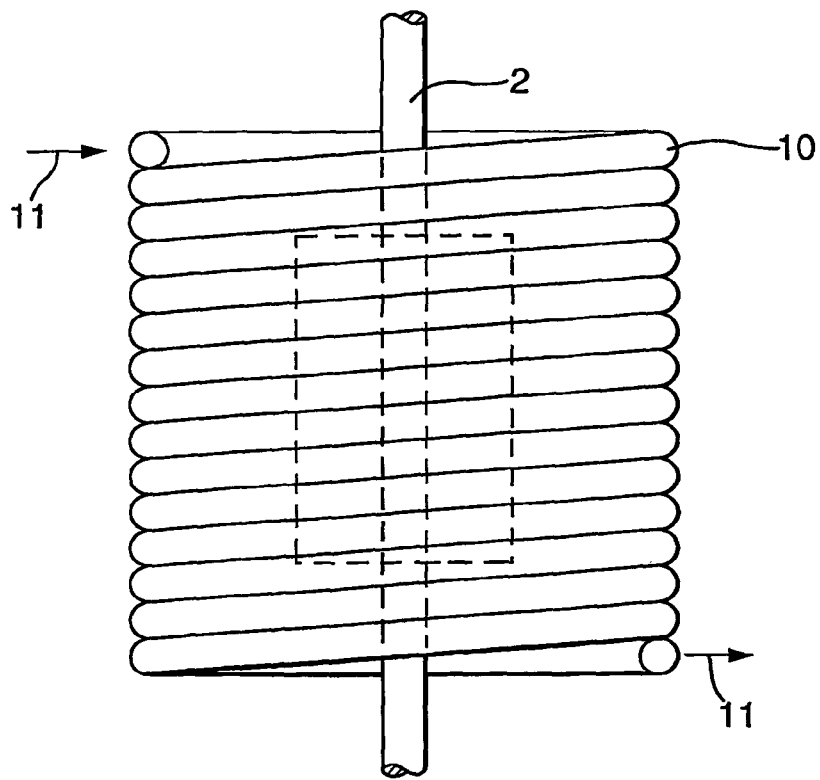
FIG. 2 shows an electric motor surrounded by a copper coil for the system of FIG. 1.

Each motor 2 is surrounded by a sleeve of copper 9. This can be a solid sleeve of copper or, as shown in FIG. 2, a coil of copper tubing 10, or both. This allows the copper sleeve to be used as a cooling mechanism by circulating a coolant fluid through the coil. The flow of coolant is shown by the arrows 11 in FIG. 2. The a.c. magnetic field generated by the motion of the armature of the motors and also the high frequency field produced by the chopped current used to control the speed of the motors induce eddy currents in the copper sleeves. These eddy currents set up ring currents in the copper sleeves which attenuate the a.c magnetic fields, limiting their reach beyond the sleeves. As represented by line 12 in FIG. 7, the effectiveness of this inductive shielding is dependent on the frequency of the magnetic field. Good shielding is seen at high frequency but none at all at zero frequency. Zero frequency is equivalent to the d.c. signature of the electric motor.

Each motor need not have its own copper sleeve, an alternative would be to surround both motors with a single copper sleeve.

Figure 6:
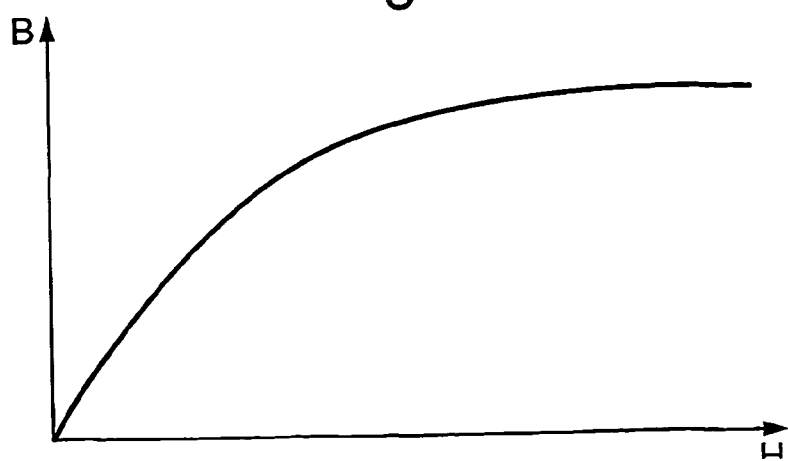
FIG. 6 shows a schematic graph of the magnetic properties of mu-metal illustrating magnetic saturation.

The motors and sleeves are contained within a casing 13 which comprises a mu-metal box. Mu-metal is an effective shield for d.c. magnetic fields. As indicated by FIG. 6, which plots the relationship between the applied field (H) and the resultant field (B), the shielding ability of mu-metal reduces with an increase in the magnitude of the applied field. The slope of the curve in FIG. 6 is the relative magnetic permeability of the mu-metal. A high permeability equates with a good shielding ability. The plateau of the curve shows that as the applied field is increased the magnetic permeability tends to one and the mu-metal is no longer effective as a shield. It is said to have reached saturation. Arranging the motors to form a quadrupole as shown in FIG. 4 reduces the magnitude of the d.c. field such that the residual d.c. field which reaches the mu-metal casing is not strong enough to lead to saturation. The effectiveness of mu-metal is also a function of the frequency of the magnetic field. As shown by line 14 in FIG. 7, zero and low frequency magnetic fields are effectively shielded but higher frequency fields are less affected.

Figure 7:
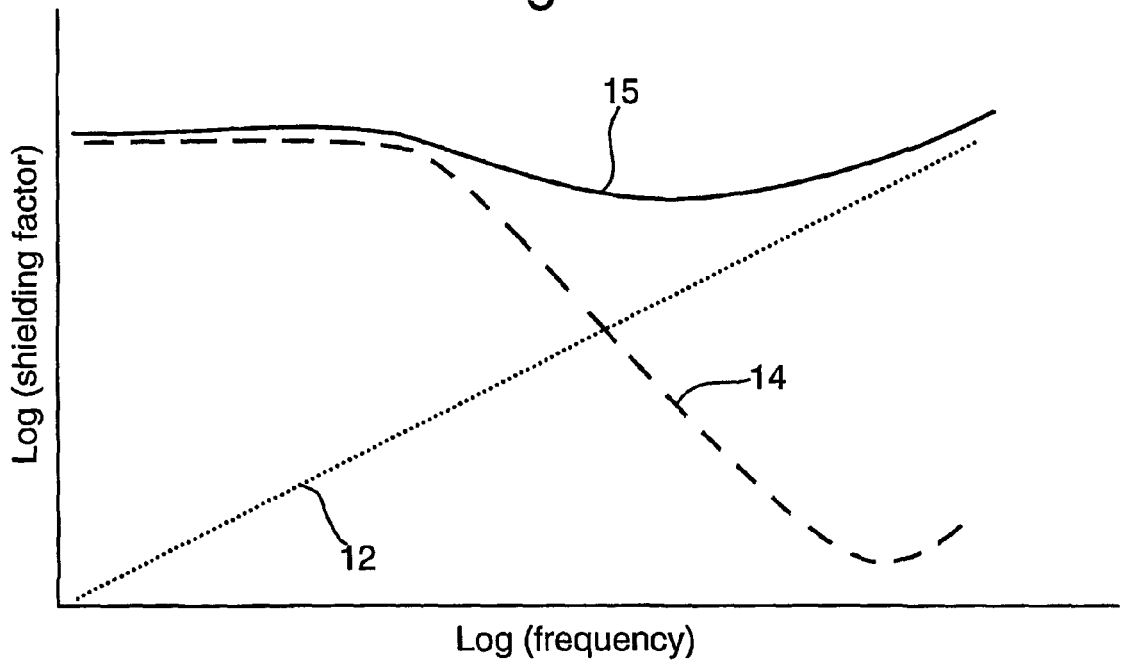
FIG. 7 shows a schematic graph of the shielding factor against frequency for the first and second shields and their compound effect.

FIG. 7 shows how the total magnetic signature of an electric motor is 30 reduced.

Figure 8:
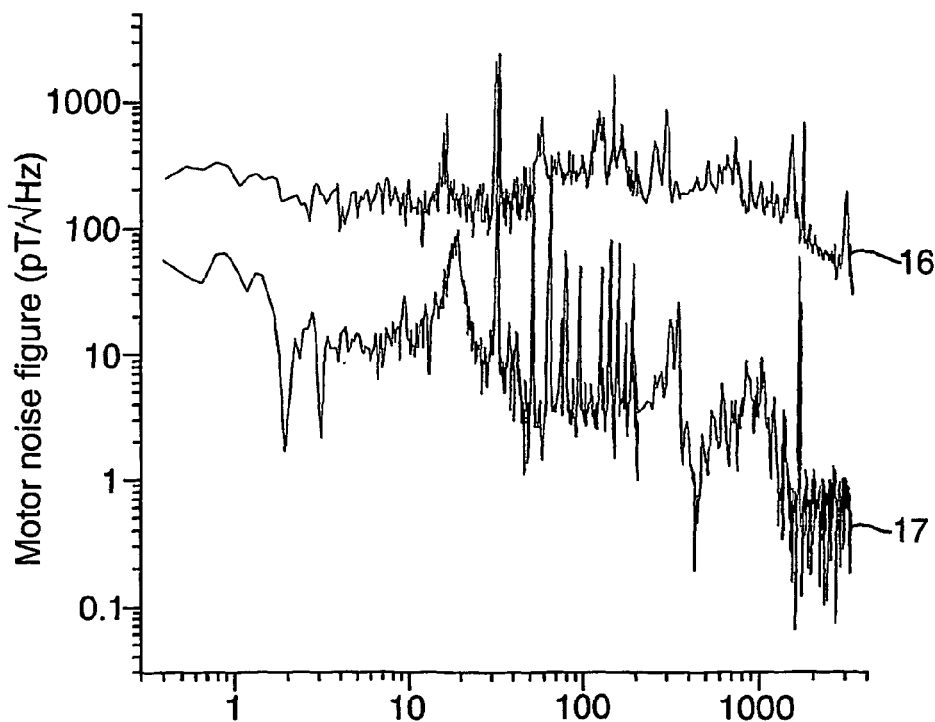
FIG. 8 shows experimental results comparing a low magnetic signature 10 motor system according to the present invention with a standard motor system.

Line 15 represents the combined effect of the inductive shielding provided by the copper sleeves and the d.c. shielding provided by the mu-metal casing. For the d.c. and low frequency components the shielding is mainly due to the mu-metal, whereas at higher frequencies where the mu-metal is less effective, inductive shielding predominates. The magnetic noise of the motors of an autonomous underwater vehicle under load is shown in FIG. 8. Measurements as a function of frequency were taken at distance of one meter. The upper trace 16 shows data which were measured for a vehicle with unshielded motors. The lower trace 17 shows the data measured from the same vehicle incorporating a low magnetic signature motor system according to the present invention. The reduction in noise is at least an order of magnitude at low frequencies, increasing to over two orders of magnitude at higher frequency.

The use of a low magnetic signature motor system according to the present invention allows sensitive magnetic detectors to be placed much closer to electric motor sources than has previously been possible.

The invention claimed is:

1. A low magnetic signature motor system, the system comprising a plurality of electric motors, a first shielding means and a second shielding means; wherein the electric motors are arranged with their associated magnetic moments forming a closed loop such that their net external magnetic field is minimised; wherein the first shielding means comprises a material with a high electrical conductivity and substantially surrounds the electric motors such that the a.c. component of the magnetic field is reduced; and wherein the second shielding means comprises a material with a high magnetic permeability and substantially surrounds the first shielding means such that the d.c. magnetic field is reduced.

2. A system according to claim 1, wherein the first shielding means comprises one of copper, aluminium, silver or gold.

3. A system according to claim 1, wherein the first shielding means comprises a tube in the form of a helical coil.

4. A system according to claim 3, wherein a coolant is circulated through the tube.

5. A system according to claim 4, wherein the coolant is one of a water based coolant, an oil based coolant, an organic liquid, a gas or a liquefied gas.

6. A system according to any preceding claim, wherein the second shielding means comprises one of mu-metal, iron, steel or nickel.

7. A system according to claim 6, wherein the second shielding means comprises mu-metal.

8. A system according to claim 2, wherein the first shielding means comprises a tube in the form of a helical coil.

* * * * *